US005560190A

United States Patent [19]
Ottaway

[11] Patent Number: 5,560,190
[45] Date of Patent: Oct. 1, 1996

[54] LETTUCE HARVESTING METHOD AND APPARATUS TO PERFORM THE SAME

[76] Inventor: James N. Ottaway, P.O. Box 56, Meadow Vista, Calif. 95722

[21] Appl. No.: 428,897

[22] Filed: Apr. 25, 1995

[51] Int. Cl.$^6$ ................................................. A01D 45/26
[52] U.S. Cl. ........................... 56/327.1; 56/DIG. 2
[58] Field of Search ................. 56/327.1, 328.1, 56/327.2, 121.4, DIG. 2, DIG. 8; 171/38, 40

[56] References Cited

U.S. PATENT DOCUMENTS

| | | | |
|---|---|---|---|
| 3,731,477 | 5/1973 | Coon | 56/327.1 |
| 3,827,503 | 8/1974 | Hansen | 171/38 |
| 4,094,238 | 6/1978 | Striplin | 171/38 X |
| 4,156,465 | 5/1979 | Porter | 171/14 |
| 4,175,621 | 11/1979 | Seem | 171/14 |
| 4,211,061 | 7/1980 | Richey | 56/327 R |
| 4,965,993 | 10/1990 | Butler et al. | 56/327.1 |
| 5,174,093 | 12/1992 | Rodriguez | 56/327.1 |

*Primary Examiner*—Terry Lee Melius
*Attorney, Agent, or Firm*—LaRiviere, Grubman & Payne

[57] ABSTRACT

Method for the automated harvesting of headed row crops, including lettuce, optionally leaving at least the crop root in the ground, and an apparatus to practice the method. The present invention provides a methodology to locate crop stems, separate the outer leaves from the head, grip the stem and harvest the head. Gripping the stem is accomplished with at least one pneumatic gripping bladder. Substantially simultaneous to gripping the head, the head is separated from the core and stem. One method to accomplish this separation is by means of a pair of differential pneumatic bladders which frees the head from the core at the center of the head, leaving the core and the outer leaves attached to the stem and root. Alternatively, a second separation method taught herein is the application of a downward force applied to the top of the head by a pneumatic bladder. The two separation schemes may be used conjointly or in the alternative. As a further alternative, the present invention teaches a harvesting method which cuts the stem at the core, leaving the core within the head and the outer leaves attached to the stem and root. Any combination of these harvesting methods may be implemented on a produce harvester constructed according to the principles of the present invention. The operator can switch at will to either harvesting method. After harvesting, a conveyor means removes the produce to a bin or other receptacle.

29 Claims, 5 Drawing Sheets

LETTUCE HARVESTING METHOD AND APPARATUS TO PERFORM THE SAME

TECHNICAL FIELD

The present invention relates to method and apparatus for harvesting a produce crop having a head, and in particular, relates to the harvesting of lettuce and similar row crops.

BACKGROUND ART

Row crops, including lettuce, cabbage, kale, chard, and the like, are typically harvested by hand. This procedure involves several steps, each typically done manually. These manual steps include cutting the headed produce from the stem, which is imbedded in the ground, removing any dehiscent, exfoliant or damaged external leaves, and loading the cut heads into some form of box or bin. The term dehiscent, as used herein refers to those leaves of the produce which have opened away from the head, and are generally not suitable for harvesting. In some lettuce harvesting operations, the roughly cleaned lettuce previously discussed is loaded into bulk crates for final packing at an off-field location. Alternatively, some traditionally packaged lettuce (whole lettuce) is wrapped in the field and packed in the shipping crates which are ultimately delivered to the greengrocer. In each of these methods, a portion of the stem, hereafter referred to as the core to which the lettuce leaves are attached, remains with the headed lettuce through harvesting, packing, shipping and eventual purchase by the consumer.

Recent marketing trends for many forms of produce, wherein the produce is to some extent processed by the packer to make it easier to use by the consumer, have received exceptional acceptance in the marketplace. One well-known example of such value-added produce is the prepared lettuce or prepackaged salad mix currently available in many markets. The previously discussed prior art harvesting methods, well suited to headed lettuce, do not provide a produce product optimally suited for value-added produce shippers who sell this form of lettuce. In particular, the core, so laboriously harvested with the lettuce leaves, must be removed or extracted from the leaves before they can be processed into lettuce mix at the packing facility.

The core must be removed not only for aesthetic reasons so that the salad mix appeals to the consumer, but also so that the core, being much denser than the leaves, is not packaged with the leaves. Because packaging systems used in the value-added produce industry often utilize measured weight of the product to determine package fill, core material incorporated in the salad mix is not only unaesthetic, but significantly reduces the amount of lettuce leaf in the package. For these reasons, it is important that core material be omitted from packaged salad mixes. Of course, removing the core, if harvested in the field and delivered to the packer, engenders additional expense. Lettuce which is harvested for value-added produce packers should therefore optimally arrive at the packing facility without dehiscent leaves or cores.

Exemplary of these prior art harvesting methods is U.S. Pat. No. 3,827,503 to Hansen ("Hansen"). Hansen teaches a tractor-mounted harvesting machine for cabbage and the like. The harvester taught therein uses ". . . stabilizing means located below said conveyor means for engaging said root to stabilize said root while it being conveyed . . . " (claim 1), and ". . . base means to engage opposites sides of said stem and pull said head downwardly on said spaced elongated rail means . . . " (claim 9) (emphasis added). Hansen is seen therefore to use the stem of the produce, which is removed from the earth with the head, to guide the produce through the conveyor means taught therein. Accordingly, Hansen does not teach any means for separating the produce from its core, nor does this reference note any benefit in doing so.

U.S. Pat. No. 4,211,061 to Richey teaches a flexible crop pickup device well suited to the harvesting of tomatoes. Richey also teaches no means for separating the produce from its core. Suited as this invention is to the harvesting of tomatoes and the like, it teaches "Any of a number of devices may be used with the disks to sever the plant stems when required." Similarly, U.S. Pat. Nos. 5,174,093 to Rodriguez ("Rodriguez") and 4,156,465 to Porter ("Porter") teach apparatus for harvesting above-ground crops without respect to the specific feature of removing the core thereof during the harvesting process, as taught by the present invention. Porter teaches a harvester conveyor having ". . . a system for keeping the conveyor links free from rocks, chunks of dirt, mud and other foreign matter . . . " Rodriguez is concerned with the non-destructive harvesting of crops. The invention taught therein is specifically designed to "strip the crop from the plants while leaving the plants in a relatively undisturbed condition after they have been picked." Again, neither Rodriguez nor Porter appreciate the benefit of separating the produce from its core, nor teach a specific method for doing so.

Accordingly, it would be desirable to provide a method for harvesting row crops, including lettuce and most particularly iceberg or other forms of headed lettuce and an apparatus to perform that method where the core is removed from the head during the harvesting process. Moreover, it would be desirable if such harvesting were faster and less costly than the currently used manual processes described elsewhere herein.

Furthermore, it would be desirable if the apparatus for practicing the method were convertible from a harvesting method delivering cored lettuce to a similarly automated method which delivers lettuce with the cores intact for shipment as head lettuce.

SUMMARY OF THE INVENTION

The present invention provides a method and apparatus for the automated harvesting of headed row crops including lettuce, cabbages, kale, chard and the like. The method taught herein removes opened, exfoliant or dehiscent leaves from the headed produce, locates and grips the stock of the produce, and pops the head from the core and stem of the produce and conveys it away to a bin or other collection device. Alternatively, the method taught herein may optionally cut the head and core from the stem, leaving the core in the head.

The apparatus of the present invention operates by locating the stem of the produce, such as iceberg lettuce, at a position just above the lowest level of leaves from the head down to the ground. It then grips the produce stem and separates the head from the core and stem. The present invention teaches two methods for this separation. In the first, an apparatus constructed according to the principles of the present invention applies a rapid and uneven upward force which causes the produce to separate from its stem, leaving the core attached to the stem and root system which remains in the ground. In the second method, the apparatus applies a rapid downward force to the top of the head, again causing the produce to separate from its stem, leaving the core attached to the stem and root system which remains in the ground. After the separation, or harvesting step, the produce is then conveyed into a bin as in normal harvesting operations.

The apparatus taught herein comprises a plurality of well supported, elongated shoes inside a housing. The shoes having a gap therebetween and having a forward, laterally tapered and upward flexed portion. In operation, the apparatus and the shoes therein are pushed along the row of produce parallel with the row and with one shoe on either the left and right sides of the produce stems. The shoes, capable of some lateral and vertical movement, track the row of lettuce stems as the apparatus is urged down the row. This has the effect of not only causing the shoes to "track" or guide the apparatus down the row of produce, but also ensures that substantially all the produce is gathered into the apparatus.

The apparatus taught herein first encounters the produce body and collapses the lower level of leaves by introducing a powerful blast of air from a tube or plenum directly above the produce as the harvester moves in a forward direction. The plenum is generally mounted on the body of the apparatus taught herein.

The air blast taught herein may be formed as a rotating vortex having a dead air spot at its center and a counter clockwise blast which reaches the outer edges of the dehiscent leaves thereby collapsing them while having little effect on the headed produce at the center of the vortex.

Immediately behind the air plenum is one or more wheels attached to each shoe and positioned so that they override the collapsed leaves, thereby holding them down until the shoes have overridden the leaves. This has the effect both of ultimately removing the collapsed leaves from the ultimately harvested lettuce heads while using the collapsed leaves to prevent dirt from contacting those heads.

The shoe system, being continually pushed forward, admits the stem of the produce into the tapered opening formed by the laterally tapered tips of the shoes as it continues to narrow down as the shoe system moves forward. At a fixed point between the two shoes, a stem gripping device is activated which holds the-stem in place. As the stem is gripped, a second device produces method for popping the head from the core. The present invention teaches two methods for this popping action. The two methods may be used alternatively or in combination.

In the first method, a rapid and uneven upward force is applied against the bottom of the produce head, thereby causing the head to separate from the stem and pulling the core out of the produce head while leaving the core attached to the stem which remains in the ground. The uneven upward force produces an upward cocking action, which causes the produce head to crack the spines of the produce where they are attached to the stem and core. This action is continued for some distance of upward travel, causing a total separation of the produce head from its core.

In the second method, a rapid downward force is applied to the top of the produce head, again causing the produce head to crack the spines of the produce where they are attached to the stem and core.

Alternative to the popping methods previously discussed, a stem cutting device may be activated in place of the stem popping device at the operator's option. This enables the same apparatus to harvest both cored and uncored lettuce, or other row crops.

An alternative to the previously discussed wheels consist of paired flaps mounted on the shoes of the present invention which perform the same hold-down function.

Additional options in the present invention include the implementation of a selection feature immediately before the popping or cutting step (the harvesting step) which selects those heads of produce suitable for harvesting and leaves unharvested those heads not suitable for harvesting at the present time. An additional option consists a misting or other watering step between the cutting or popping steps and the conveying step. The purpose of this misting step is to preserve and enhance the freshness of the harvested head, thereby improving its freshness on receipt at the packing plant.

After the produce heads are cut or popped, a conveyor device conveys the harvested, heads away from the harvesting apparatus and to a storage device such as a bin, box or other produce storage device. Any of several conveyor devices are deemed suitable for inclusion for use in the present invention including, but not limited to endless belts, elevators, suction tubes and rails. Well known to those of ordinary skill in the art is the fact that endless belt conveyors may have any number of adjuncts thereto to improve their function. These adjuncts include, but again are not limited to: fingers, brushes, flaps, leaves, and the like. The present invention specifically contemplates their use.

Other features of the present invention are disclosed or apparent in the section entitled Best Mode for Carrying Out The Invention.

BRIEF DESCRIPTION OF THE DRAWINGS

For fuller understanding of the present invention, reference is made to the accompanying drawing in the following detailed description of the Best Mode of Carrying Out the Invention. In the drawing.

Figure 1:
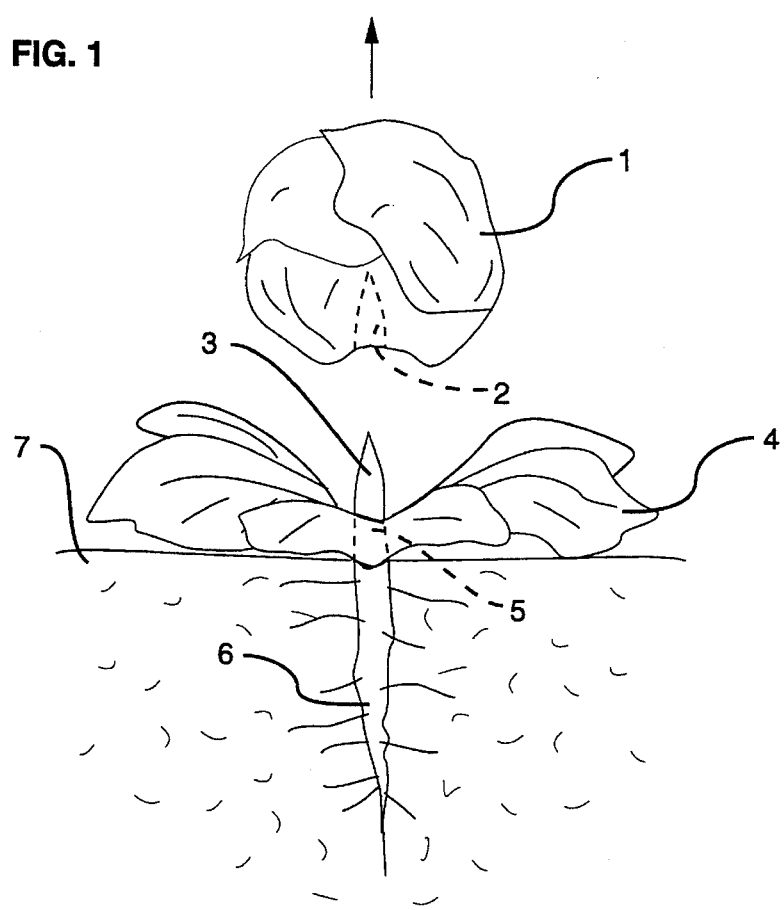
FIG. 1 is a representation of a head of iceberg lettuce immediately after having been popped from its core, the core and stem being depicted in the ground.

Reference numbers refer to the same or equivalent parts of the present invention throughout the several figures of the drawing.

BEST MODE OF CARRYING OUT THE INVENTION

Referring now to FIG. 1, the harvesting method according to the principles of the present invention is described, as applied to headed lettuce, for instance, iceberg lettuce. Head 1 is removed or "popped-off" from core 3, leaving substantially all of core 3, stem 5 and root 6 implanted in the earth. Dehiscent leaves 4, for instance the first row or whorl of leaves, are left attached to stem 5. It has been found that with many forms of lettuce directly pulling head 1 upward has the result of removing root 6 and stem 5 from the earth and fails to dislodge core 3 from head 1. Therefore according to the present invention, one means of separating the produce head from its core and the apparatus which practices that method to provide an upward cocking action which causes the produce head to crack the spines of the produce leaves where attached to the stem and core. This cocking action causes a total separation of the head from the core and the stem to which it is attached. Either as an alternative to this cocking action, or as an adjunct thereto, the present invention also teaches separating the head by means of the application of a sharp downward force applied to the head of the produce.

Figure 2:
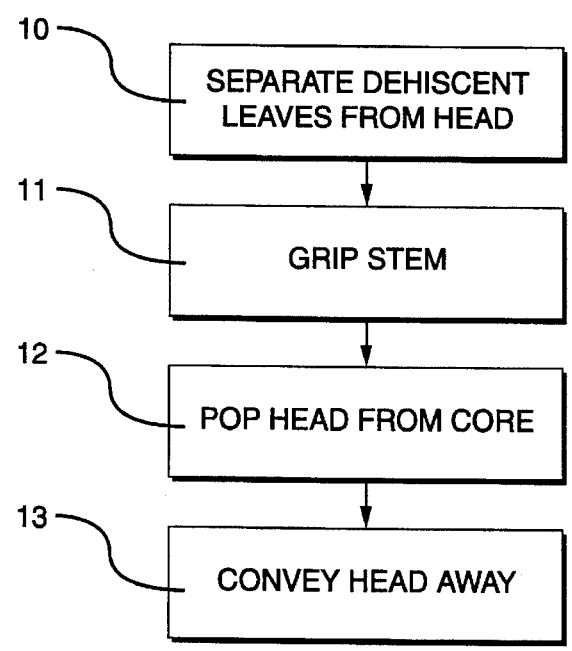
FIG. 2 is a system flow chart of the method taught by the present invention.

Referring now to FIG. 2, the principal steps in the method taught by the present invention are shown. In the preferred embodiment of the present invention, dehiscent or opened leaves are collapsed away from the head of the lettuce. The stem is then gripped at step 11 to aid in its being retained in the earth. After gripping of the stem at step 11, at step 12, the head is popped from the core, separating the head from the core and stem. After the head is popped from the stem, it is conveyed away at step 13, for instance to a produce bin. While the previously discussed steps form the basis for the present invention, it will be immediately apparent to those of ordinary skill in the art that the order of their accomplishment may be rearranged with equal facility to suit the internal arrangement of the apparatus performing the method.

In-addition to the previously discussed method steps, the present invention teaches a number of refinements thereto. In particular, the present invention contemplates a method used to locate the stems wherein a well supported system of a plurality of elongate parallel shoes having a gap therebetween rides directly on top of the collapsed dehiscent leaves. In operation, these shoes are pushed along in a direction substantially parallel with and on both the right and left sides of the produce stems. Furthermore, the method taught herein specifically contemplates the employment of a head cutting step in place of the previously discussed head popping step, thereby separating the head from the stem while leaving the core in place as in typically packed head lettuce.

Figure 3:
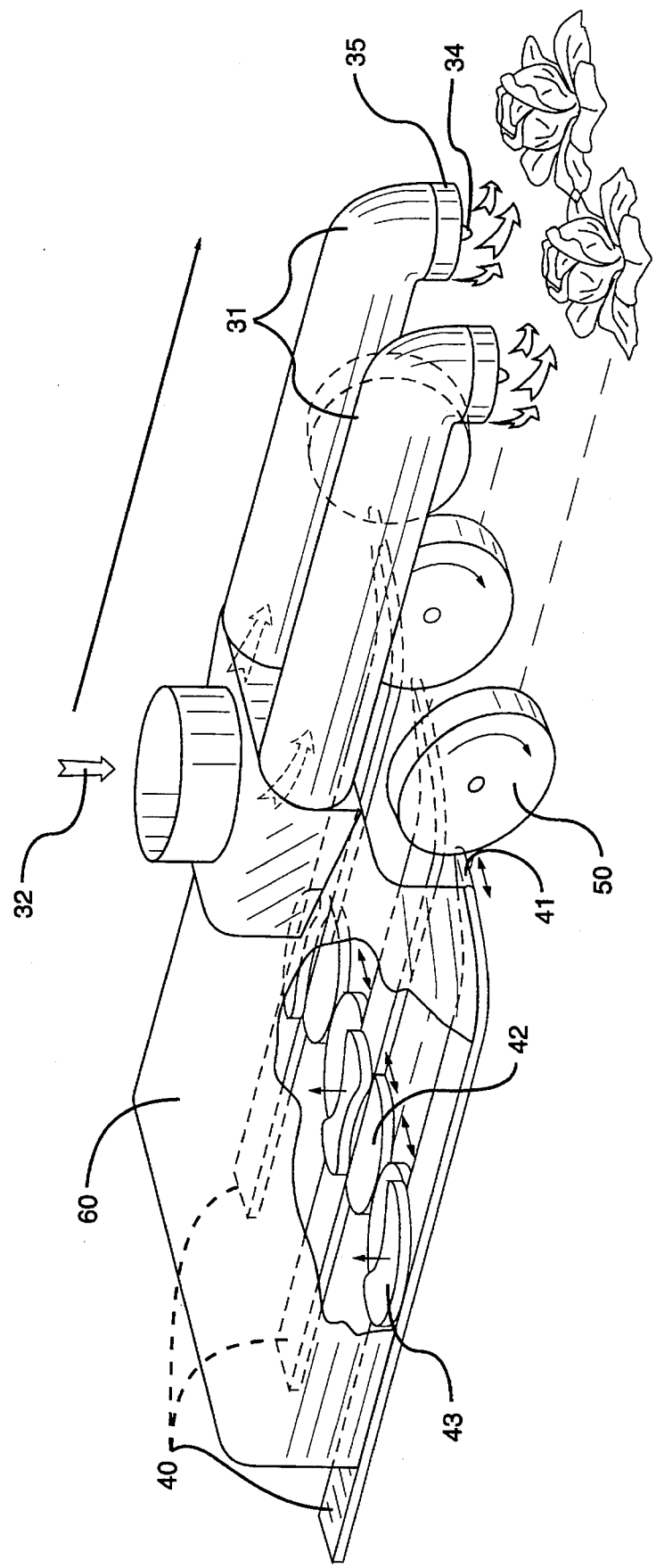
FIG. 3 is a cut-away conceptual diagram of the apparatus of the present invention.

Referring now to FIG. 3, a cut-away conceptual diagram of the preferred embodiment of an apparatus for performing the method taught by the present invention is shown. The apparatus is constructed on a frame or housing 60. The apparatus may be mounted on, or pushed or pulled behind a wheeled or tracked agricultural tractor for use. Alternatively, the high volume lettuce harvester taught by the present invention is implemented in multiple units mounted on, and integrated with, a field harvesting vehicle designed and built specifically for high speed, high volume headed produce harvesting.

Having continued reference to FIG. 3, the apparatus of the present invention, being propelled along a row of headed produce (not shown), first encounters the head and collapses the lower or dehiscent leaves thereof. This is accomplished by introducing a powerful blast of counter-clockwise rotating air from plenum 31 directly above the produce as the harvester moves in the forward direction. Plenum 31 has attached thereto a vortex forming apparatus 35, which produces the previously discussed vortex effect. In the preferred embodiment, this vortex forming apparatus contains stationary vanes (not shown) installed therein. A manifold 32 is connected to a source of high volume compressed air for supplying plenums 31.

The previously discussed counter-clockwise rotating vortex generally has a dead air spot in the center of the vortex maximizing the counter-clockwise blast effect on the outer reaches of the produce head, but having little effect on the center of the head. One method for assisting in the production of this dead air spot is the implementation of an aerodynamic solid body 34 substantially in the center of plenum 31. Body 34, in the preferred embodiment of the present invention, is substantially torpedo-shaped.

It will be immediately apparent to those of ordinary skill in the art that alternative air blast geometries may be required for varying types of row crops. While the counter rotating vortex taught herein is particularly applicable to the harvesting of iceberg lettuce, the present invention specifically contemplates alternative air blast geometries including, but not limited to clockwise rotating air vortices, direct blasts, split blasts, multiple blasts, or other geometries required by the produce geometry for which the present invention is utilized.

Immediately behind and somewhat below plenum 31 is at least one wheel 50. In the preferred embodiment, wheel 50 is mounted on an axle attached to housing 60. Wheel 50 first encounters and overrides the collapsed leaves (not shown) of the produce. On overriding the collapsed leaves, wheel 50 pulls the leaves down to the surface of the earth until shoes 40 have ridden up and onto the collapsed leaves. This system not only prevents the harvesting of the unwanted dehiscent leaves, but utilizes the collapsed or dehiscent leaves to assist in preventing dirt from contacting the produce head as it is harvested. Shoes 40, being continually pushed forward, admit the stem of the produce into the tapered opening formed by shoe tips 41. The tapered opening progressively narrows as shoes 40 move forward. At a fixed point behind tapered tip 41, a stem gripping device 42 is activated which holds the stem in place. Gripping device 42 consists of at least one, and preferably paired pneumatic bladders mounted on shoe 40. These bladders are rapidly and simultaneously inflated by pneumatic means from both the left and right sides of the stem, thereby holding the stem firmly in place in direct proportion to that amount of air pressure applied to the bladders. Substantially simultaneous to the stem gripping device activation is a second pneumatic device that produces the previously discussed head popping function. This device consisting of the second set of paired pneumatic bladders 43. Bladders 43 are of a slightly unequal or differential size. Bladders 43, when inflated by pneumatic or other means, produce a rapid and uneven upward force against the bottom of the produce head, causing the head to separate from the stem and-pulling the core out of the produce head, leaving the core attached to the stem which remains in the ground.

One upward bladder, for instance the left upward bladder, being smaller than other, for instance the right upward bladder, when activated produces an upward cocking action. This cocking action causes the produce head to crack the spines of the produce leaves where attached to the stem and core. This upward action is continued for a travel of an appropriate upward distance, causing a total separation of the head from the core. In the case of an iceberg lettuce harvester according to the present invention, an upward travel of approximately inches is deemed sufficient to de-core the heads with a high degree of probability.

Figures 4, 5:
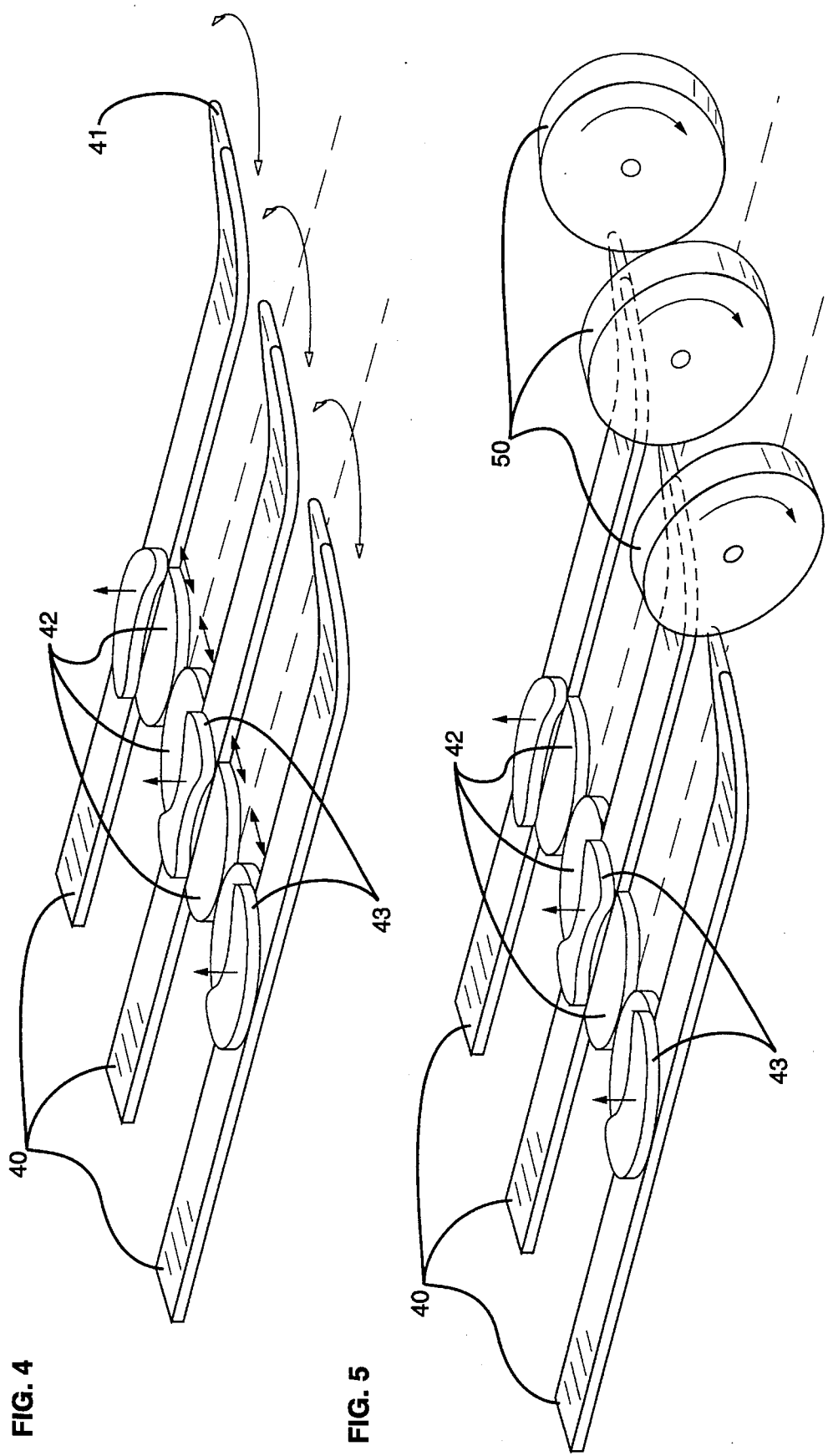
FIG. 4 is a depiction of the shoe system of the present invention showing the stem grippers and head poppers attached thereto.
FIG. 5 is a further depiction of the shoe system of the present invention having the wheels attached thereto.

Referring now to FIG. 4, the arrangement of stem gripping bladders 42 and head popping bladders 43 are shown with relation to shoes 40.

While the preferred embodiment of the present invention utilizes pneumatically inflatable bladders for the previously discussed gripping and popping steps, it will be immediately apparent to those of ordinary skill in the art that alternative actuation methodologies may be utilized. Such actuation methodologies include, but are not limited to hydraulic cylinders, hydraulically inflatable bladders, electric servomechanisms, electric solenoids, mechanical arms, mechanical cams, eccentrics, or other means of transmitting force well known to those of ordinary skill in the art, and the present invention specifically contemplates their use.

Having reference now to FIG. 5, the arrangement of wheels 50 with respect to shoes 40 is shown. Wheels 50 may consist of low pressure, large pneumatic tires, sponged rubber tires, or other substantially large, deformable wheels having a generally soft consistency. Wheels 50 may be mounted, via an axle to frame 60 or to the tips, 41 of shoes 40.

Figure 6:
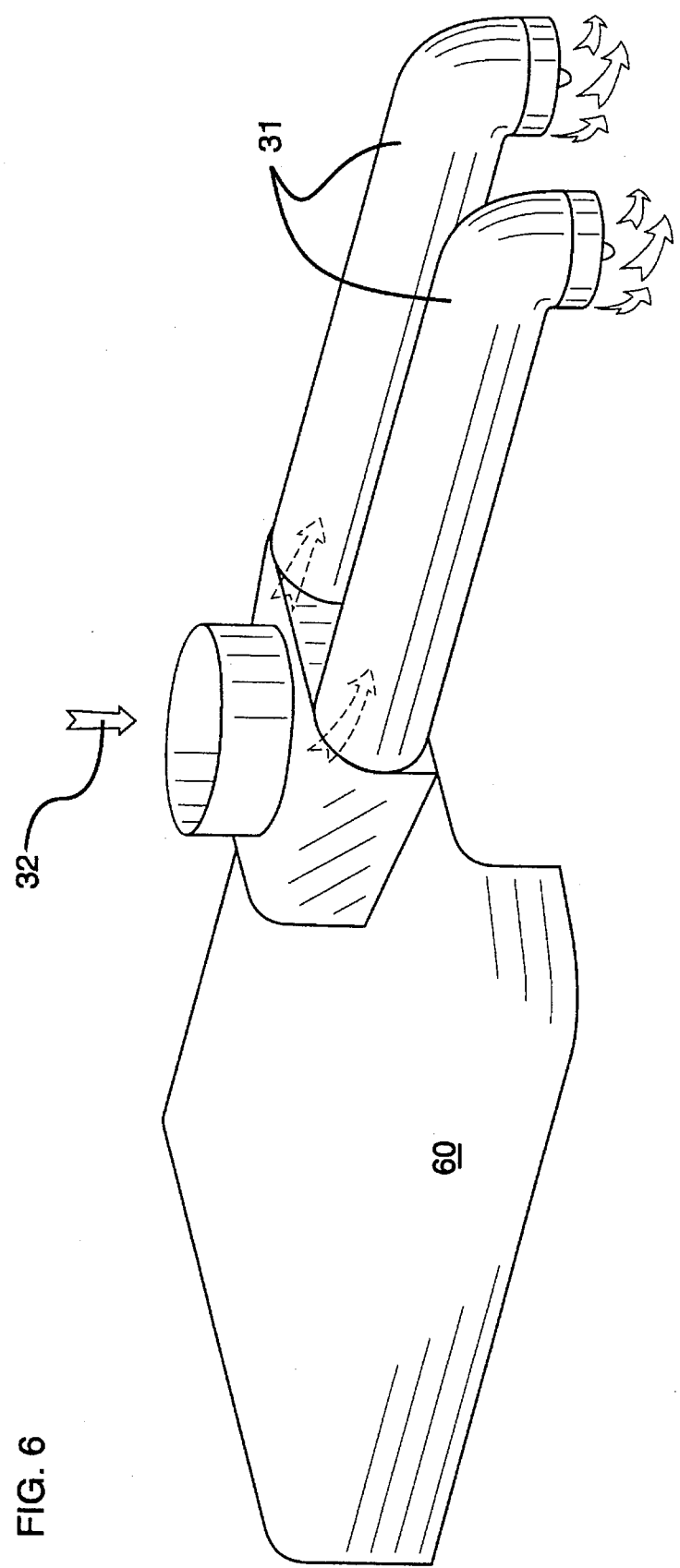
FIG. 6 is a depiction of the outer housing of the present invention having mounted thereon the air system taught herein.

Referring now to FIG. 6, housing, or frame, 60 having manifold 32 and plenums 31 mounted thereon is shown.

Figure 8:
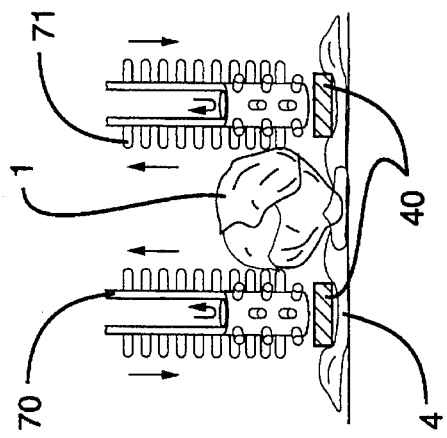
FIG. 8 is a front view of the same conveyor implemented on the present invention.
Figure 7:
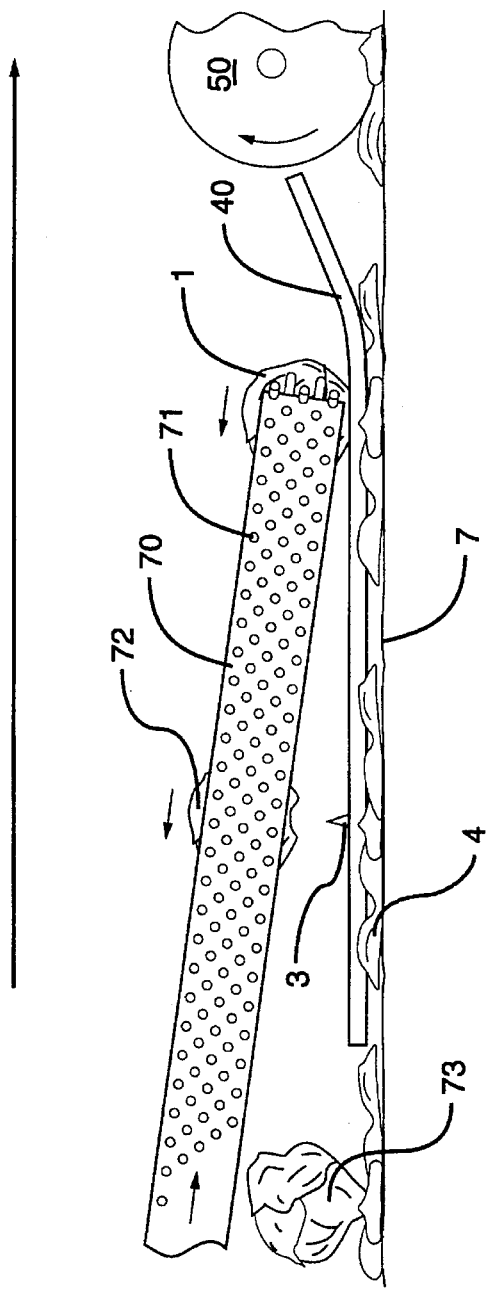
FIG. 7 is a side view of one conveyor implemented on the present invention.

The conveyor device of the preferred embodiment is shown at FIGS. 7 and 8. Having reference to FIG. 7, a side view of the conveyor is shown. As shoes 40 are urged forward along the row of produce, head 1 is captured therebetween. Operating in combination with shoes 40 are a pair of endless belts 70, each having implemented thereon a plurality of flexible fingers 71. Belts 70 may be positioned at an angle with respect to shoes 40. In the preferred embodiment, it was determined that belts 70 having an angle of 6° with respect to shoes 40 was especially suitable for the harvesting of iceberg lettuce. Fingers 71 flexibly engage head 1 as it travels the length of shoe 40. At least one hydraulic motor (not shown) counter-rotates the belts such that the belts urge the head rearward after harvesting. If head 1 is popped from core 3 by the previously discussed differential bladders (not shown in this figure), fingers 71, flexibly engaging head 1, lift it free from core 3, as at 72. If head 1 is not selected for harvesting, it slips from the previously discussed flexible engagement with fingers 71 and remains planted in the ground, as at 73.

Having continued reference to FIG. 7, the action of shoes 40, riding along collapsed leaves 4 is shown. Collapsed by the previously discussed air blast (not shown) and wheel 50, leaves 4 are maintained in the collapsed position during harvesting by shoes 40 which overrides and rides upon them. In this manner, contact between shoes 40 and earth 7 is minimized.

Referring now to FIG. 8, the configuration of belts 70 with respect to shoes 40 and head 1 is shown from a front view.

The present invention has been particularly shown and described with respect to certain preferred embodiments and features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specially disclosed herein. Alternative plenum geometries, air blast geometries, wheel configurations, gripping, popping and cutting apparatus, conveying devices and configurations thereof are all specifically contemplated in forming the apparatus taught by the present invention.

I claim:

1. A method for the harvesting of headed produce, said produce including a stem, a root, and a head having leaves, the method comprising the steps of:

collapsing the outer leaves of said produce;

gripping said stem above said outer leaves;

removing said head from said stem, while leaving said outer leaves behind and said root in the ground; and conveying said head to a collection point.

2. The method of claim 1 wherein said removing step further comprises the step of applying an unequal force to the underside of said head, thereby separating said head from said stem.

3. The method of claim 1 wherein said removing step further comprises the step of cutting said head from said stem.

4. The method of claim 1 wherein said removing step further comprises the step of applying a rapid downward force to the top of said head, thereby separating said head from said stem.

5. A method for the automated harvesting of lettuce, said lettuce including a head having leaves, a stem, a portion of said stem forming a core within said head, and a root, the method comprising the steps of:

collapsing the outer leaves of said lettuce away from said head;

locating said stem;

gripping said stem above said outer leaves;

applying an unequal force to the underside of said head, thereby harvesting said head from said stem, while leaving said stem, core, outer leaves and root intact, and said root in the ground; and conveying said head to a collection bin.

6. The method of claim 5 wherein said collapsing step further comprises the steps of:

separating said outer leaves from said head by means of a blast of air; and pressing said outer leaves with a pressing means.

7. The method of claim 6 wherein said pressing step further comprises the step of pressing said outer leaves with at least one wheel.

8. The method of claim 6 wherein said pressing step further comprises the step of pressing said outer leaves with at least one flap.

9. The method of claim 5 wherein said locating step further comprises the steps of:

urging each of a pair of tapered, sloping shoes on either side of said stem; and overriding said outer leaves with said shoes and holding said outer leaves substantially against the ground and away from said stem.

10. The method of claim 5 wherein said gripping step further comprises the steps of:

positioning said stem adjacent to at least one first pneumatically inflatable bladder; and inflating said first pneumatically inflatable bladder.

11. The method of claim 5 wherein said step of applying said unequal force further comprises the steps of:

positioning a first and second pneumatically differential inflatable bladder adjacent to said stem, and under said head;

inflating said first and second pneumatically differential inflatable bladders.

12. A method for the automated harvesting of lettuce, said lettuce including a head having leaves, a stem, a portion of said stem forming a core within said head, and a root, the method comprising:

separating said outer leaves from said head by means of a blast of air; and pressing said outer leaves with at least one wheel;

urging each of a pair of tapered, sloping shoes on either side of said stem; and overriding said outer leaves with said shoes and holding said outer leaves substantially against the ground and away from said stem;

positioning at least one first pneumatically inflatable bladder adjacent to said stem;

inflating said first pneumatically inflatable bladder;

positioning a first and second pneumatically differential inflatable bladder adjacent to said stem, and under said head;

inflating said first and second pneumatically differential inflatable bladders, thereby harvesting said head from said stem, while leaving said stem, core, outer leaves and root intact, and said root in the ground; and conveying said head to a collection bin.

13. Apparatus for the harvesting of headed produce, said produce including a head having leaves, a stem, and a root, the apparatus comprising:

a body;

collapsing means disposed upon said body for collapsing the outer leaves of said produce;

gripper means, further disposed upon said body, for gripping said stem above said outer leaves;

harvester means, further disposed upon said body and in operative combination with said gripper means, for removing said head from said stem, while leaving said outer leaves behind and said root in the ground; and conveyor means, operatively associated with said harvester means, for conveying said head to a collection point.

14. The apparatus of claim 13 wherein said harvester means further comprises means, in operative combination with said gripper means, for applying an unequal force to the underside of said head, thereby separating said head from said stem.

15. The apparatus of claim 13 wherein said harvester means further comprises stem cutting means, in operative combination with said gripper means, for cutting said head from said stem.

16. Apparatus for the automated harvesting of lettuce, said lettuce including a head having leaves, a stem, a portion of said stem forming a core within said head, and a root, the apparatus comprising:

a frame;

leaf collapsing means, disposed upon said frame, for collapsing the outer leaves of said lettuce away from said head;

stem locating means, further disposed upon said frame, for locating said stem;

stem gripping means, operatively associated with said stem locating means, for gripping said stem above said outer leaves;

forcing means, operatively associated with said stem gripping means, for applying an unequal force to the underside of said head, thereby harvesting said head from said stem, while leaving said stem, core, outer leaves and root intact, and said root in the ground; and conveyor means, in operative combination with said frame, for conveying said head to a collection bin.

17. The apparatus of claim 16 wherein said leaf collapsing means further comprises:

leaf separation means for separating said outer leaves from said head by means of a blast of air; and leaf pressing means for pressing said outer leaves for pressing said outer leaves away from said stem.

18. The apparatus of claim 17 wherein said leaf pressing means further comprises at least one wheel.

19. The apparatus of claim 17 wherein said leaf pressing means further comprises at least one flap.

20. The apparatus of claim 16 wherein said stem locating means further comprises:

a pair of tapered, sloping shoes for urging of either side of said stem and for overriding said outer leaves with said shoes and holding said outer leaves substantially against the ground and away from said stem.

21. The apparatus of claim 16 wherein said stem gripping means further comprises:

at least one first pneumatically inflatable bladder positioned adjacent to said stem; and bladder inflation means for inflating said first pneumatically inflatable bladder.

22. The apparatus of claim 16 wherein said forcing means further comprises:

first and second pneumatically differential inflatable bladders, operatively associated with said stem gripping means, positionable adjacent to said stem, and under said head;

inflating means for inflating said first and second pneumatically differential inflatable bladders.

23. Apparatus for the automated harvesting of lettuce, said lettuce including a head having leaves, a stem, a portion of said stem forming a core within said head, and a root, the apparatus comprising:

a frame;

an air plenum, disposed upon said frame, for separating said outer leaves from said head by means of a blast of air;

a pair of tapered, sloping shoes, further disposed upon said frame, for locating said stem, for overriding said outer leaves, and for holding said outer leaves substantially against the ground and away from said stem;

at least one first pneumatically inflatable bladder, disposed upon at least one of said shoes, and positionable adjacent to said stem for gripping said stem and precluding it's removal from the earth;

first and second pneumatically differential inflatable bladders, positionable adjacent to said stem and under said head for applying an unequal upward force to the underside of said head, thereby harvesting said head from said stem, while leaving said stem, core, outer leaves and root intact, and said root in the ground;

compressed air means for providing compressed air to said air plenum, said first pneumatically inflatable bladder and said first and second pneumatically differential inflatable bladders; and conveyor for conveying said head to a collection bin.

24. The apparatus of claim 23 further comprising at least one wheel, operatively associated with said shoes, for pressing said outer leaves down so that said shoes override said outer leaves.

25. The apparatus of claim 23 further comprising a produce selection device, operatively associated with said first pneumatically inflatable bladder and said first and second pneumatically differential inflatable bladders for selecting lettuce for harvesting.

26. The apparatus of claim 23 further comprising a misting device, operatively associated with said first and second pneumatically differential inflatable bladders for applying a mist of water to said lettuce subsequent to harvesting.

27. A method for the automated harvesting of lettuce, the lettuce including a head having leaves, a stem, a portion of the stem forming a core within the head, and a root, the method comprising:

separating the outer leaves from the head by means of a blast of air; and pressing the outer leaves with at least one wheel;

urging each of a pair of tapered, sloping shoes on either side of the stem; and overriding the outer leaves with the shoes and holding the outer leaves substantially against the ground and away from the stem;

positioning at least one first pneumatically inflatable bladder adjacent to the stem;

inflating the first pneumatically inflatable bladder;

positioning a second pneumatically inflatable bladder adjacent to the top of the head;

inflating the second pneumatically inflatable bladder, thereby harvesting the head from the stem, while leaving the stem, core, outer leaves and root intact, and the root in the ground; and conveying the head to a collection bin.

28. Apparatus for the automated harvesting of lettuce, the lettuce including a head having leaves, a stem, a portion of the stem forming a core within the head, and a root, the apparatus comprising:

a frame;

an air plenum, disposed upon the frame, for separating the outer leaves from the head by means of a blast of air;

a pair of tapered, sloping shoes, further disposed upon the frame, for locating the stem, for overriding the outer leaves, and for holding the outer leaves substantially against the ground and away from the stem;

at least one first pneumatically inflatable bladder, disposed upon at least one of the shoes, and positionable adjacent to the stem for gripping the stem and precluding it's removal from the earth;

at least one second pneumatically inflatable bladder, positionable adjacent to the top of the head and for applying a rapid downward force to the top of the head, thereby harvesting the head from the stem, while leaving the stem, core, outer leaves and root intact, and the root in the ground;

compressed air means for providing compressed air to the air plenum and the first and second pneumatically inflatable bladders; and conveyor means for conveying the head to a collection bin.

29. The apparatus of claim 28 wherein the conveyor means further comprises:

at least one endless belt in operative combination with the shoes, the belt having a plurality of fingers disposed on the external surface thereof for releasable engagement with the head; and rotation means for rotating the endless belt, thereby conveying the head away from the core.

* * * * *